(12) United States Patent
Joo et al.

(10) Patent No.: US 10,126,915 B2
(45) Date of Patent: Nov. 13, 2018

(54) CONCENTRATED CONTROL SYSTEM FOR VEHICLE

(71) Applicant: Hyundai Motor Company, Seoul (KR)

(72) Inventors: Sihyun Joo, Seoul (KR); Dongsoo Shin, Gyeonggi-Do (KR); Jongmin Oh, Ulsan (KR); Jungsang Min, Seoul (KR)

(73) Assignee: Hyundai Motor Company, Seoul (KR)

( * ) Notice: Subject to any disclaimer, the term of this patent is extended or adjusted under 35 U.S.C. 154(b) by 616 days.

(21) Appl. No.: 14/720,793

(22) Filed: May 24, 2015

(65) Prior Publication Data

US 2016/0162126 A1 Jun. 9, 2016

(30) Foreign Application Priority Data

Dec. 9, 2014 (KR) ........................ 10-2014-0175828

(51) Int. Cl.
| | |
|---|---|
| *G06F 3/0482* | (2013.01) |
| *G06F 3/0485* | (2013.01) |
| *G06F 3/0488* | (2013.01) |
| *G06F 3/01* | (2006.01) |
| *G06F 3/0362* | (2013.01) |
| *G06F 3/0354* | (2013.01) |

(52) U.S. Cl.
CPC ............ *G06F 3/0482* (2013.01); *G06F 3/016* (2013.01); *G06F 3/0362* (2013.01); *G06F 3/03547* (2013.01); *G06F 3/0485* (2013.01); *G06F 3/0488* (2013.01)

(58) Field of Classification Search
CPC ...... G06F 3/016; G06F 3/0362; G06F 3/0482; G06F 3/0485; G06F 3/0488; G06F 3/03547

USPC ................ 345/30, 156–184, 660; 715/708; 705/27.1; 369/12; 358/1.13
See application file for complete search history.

(56) References Cited

U.S. PATENT DOCUMENTS

| | | | | |
|---|---|---|---|---|
| 6,147,938 | A * | 11/2000 | Ogawa ................ | G11B 31/003 369/12 |
| 6,812,942 | B2 * | 11/2004 | Ribak ................... | B60K 35/00 345/30 |
| 6,930,959 | B2 * | 8/2005 | Narayanaswami .... | G04G 21/00 200/14 |
| 8,456,534 | B2 * | 6/2013 | Henty .................. | G06F 3/0304 345/157 |
| 2005/0223342 | A1 * | 10/2005 | Repka .................. | G06F 3/0481 715/851 |
| 2005/0259077 | A1 * | 11/2005 | Adams ................. | G06F 3/0213 345/163 |

(Continued)

FOREIGN PATENT DOCUMENTS

| | | |
|---|---|---|
| JP | 2004-050916 A | 2/2004 |
| KR | 10-0870928 | 11/2008 |

(Continued)

*Primary Examiner* — Prabodh M Dharia
(74) *Attorney, Agent, or Firm* — Mintz Levin Cohn Ferris Glovsky and Popeo, P.C.; Peter F. Corless

(57) ABSTRACT

A concentrated control system for a vehicle includes: a menu portion that, when rotated, provides menu modes associated with devices in the vehicle; and a first menu providing portion that scrolls menu buttons, included in an enabled menu and used to control functions of an in-vehicle device, in a first direction so that the scrolled menu buttons are displayed within the menu portion.

16 Claims, 15 Drawing Sheets

(56) References Cited

U.S. PATENT DOCUMENTS

| | | | |
|---|---|---|---|
| 2007/0063995 A1* | 3/2007 | Bailey | G06F 3/0482 345/184 |
| 2007/0126698 A1* | 6/2007 | Iwamoto | G01C 21/3664 345/156 |
| 2008/0101053 A1* | 5/2008 | Hoffman | G09F 21/045 362/35 |
| 2009/0235201 A1* | 9/2009 | Baalbergen | G06F 3/017 715/785 |
| 2010/0026626 A1* | 2/2010 | Macfarlane | G06F 3/0213 345/160 |
| 2010/0174421 A1* | 7/2010 | Tsai | G06F 1/1616 700/302 |
| 2010/0201893 A1* | 8/2010 | Pryor | B60K 35/00 348/744 |
| 2011/0040547 A1* | 2/2011 | Gerber | A61N 1/36185 703/11 |
| 2012/0110449 A1* | 5/2012 | Frey | G06Q 30/0603 715/708 |
| 2013/0194183 A1* | 8/2013 | Odgers | G06F 1/162 345/158 |
| 2013/0265457 A1* | 10/2013 | Henty | H04N 21/42222 348/211.99 |
| 2013/0335767 A1* | 12/2013 | Ha | G03G 15/5016 358/1.13 |
| 2014/0002505 A1* | 1/2014 | Yoshimi | G06F 3/03547 345/660 |
| 2014/0009385 A1* | 1/2014 | Ku | G09G 5/32 345/156 |
| 2014/0019893 A1* | 1/2014 | Gudmundsson | G06F 17/30011 715/764 |
| 2014/0168044 A1* | 6/2014 | Hu | G09G 3/3696 345/90 |
| 2014/0215403 A1 | 7/2014 | Wengelnik et al. | |
| 2014/0320411 A1* | 10/2014 | Kuzmin | G06F 3/04886 345/168 |
| 2015/0019981 A1* | 1/2015 | Petitt, Jr. | G06F 3/04842 715/738 |
| 2015/0081478 A1* | 3/2015 | Bahrami | G06F 3/0485 705/27.1 |
| 2015/0274242 A1* | 10/2015 | Osanai | B60K 23/02 74/491 |
| 2016/0299562 A1* | 10/2016 | Henty | H04N 21/42222 |

FOREIGN PATENT DOCUMENTS

| | | |
|---|---|---|
| KR | 10-2011-0062221 A | 6/2011 |
| KR | 10-2013-0070477 A | 6/2013 |

* cited by examiner (a) 3x3 asymmetrical structure    (b) 4x4 asymmetrical structure

CONCENTRATED CONTROL SYSTEM FOR VEHICLE

CROSS-REFERENCE TO RELATED APPLICATION

This application claims priority to and the benefit of Korean Patent Application No. 10-2014-0175828 filed in the Korean Intellectual Property Office on Dec. 9, 2014, the entire contents of which are incorporated herein by reference.

BACKGROUND OF THE DISCLOSURE (a) Technical Field

The present disclosure relates generally to a technology related to a concentrated control system for a vehicle, and more particularly, to a concentrated control system for a vehicle that has a cube structure and controls a variety of equipment contained in the vehicle.

(b) Description of the Related Art

Artificial intelligence-based vehicles are being developed using convergence technologies to integrate electric, electronic, and communication technologies making the vehicles safer and more comfortable. Such vehicles can use information and communication technologies to develop vehicles into high-tech information tools and use corresponding tangible and intangible multimedia information technologies. Security and intelligence technologies continue to evolve in line with the progress of multimedia technology to ultimately make comfortable vehicles that provide drivers with infotainment in a more convenient way. This evolution of vehicles is inevitably leading to the development of technology for transmission of information to drivers.

Recent in-vehicle displays have developed into essential equipment for human-machine interface (HMI) that provides drivers with a display screen, in addition to useful information about vehicle operation, such as vehicle state, convenience equipment control, navigation, telematics, etc. The complexity of vehicles and a diversity of vehicle operation patterns require drivers to manipulate their vehicle often while driving in order to receive information from the interior and exterior of the vehicle. The types of information are becoming more diverse, such as voice, data, video, graphics, etc.

In general, a user interface (UI) allows a user to interact with or give feedback to applications, websites, etc., via information-related devices such as a display screen, a keyboard, a mouse, a light pen, a desktop environment, colored text, on-screen help, etc. Meanwhile, a driver information system (DIS) may be employed, which provides functions, like controlling a vehicle's electric/electronic systems via a mobile phone in case the driver wants to make sure the car doors are locked properly. The driver information system is a convergence of vehicle network technologies that interfaces various types of multimedia devices (e.g., audio, a satellite positioning system, DVD, etc.) and electronic control devices (e.g., an air conditioning system, seats, a steering wheel, etc.) through digital technology. Moreover, the driver information system allows for control of various types of multimedia devices, temperature control, and automatic control of the seats, the steering wheel, etc., to fit all body types, all on a monitor alone, and also enables the driver to control various types of equipment for the vehicle via a mobile phone.

A typical DIS uses a jog dial in place of multiple buttons that have been conventionally used in vehicles, for the sake of simplification of UI. The jog dial may be a combination of a multi-directional joystick, a shuttle dial, and push buttons. However, as more menus are being added to the DIS and even more input buttons are needed to enter data, including text input, on-screen options, etc., arranging these input buttons in an efficient way is becoming increasingly challenging.

The above information disclosed in this Background section is only for enhancement of understanding of the background of the disclosure and therefore it may contain information that does not form the related art that is already known in this country to a person of ordinary skill in the art.

SUMMARY OF THE DISCLOSURE

The present disclosure has been made in an effort to provide a concentrated control system for a vehicle that has a cube structure and controls a variety of equipment contained in the vehicle.

Embodiments of the present disclosure provide a concentrated control system for a vehicle, the system including: a menu portion that, when rotated, provides menu modes associated with devices in the vehicle; and a first menu providing portion that scrolls menu buttons, included in an enabled menu and used to control functions of an in-vehicle device, in a first direction so that the scrolled menu buttons are displayed within the menu portion.

The concentrated control system may further include a reference display portion displaying the enabled menu.

The concentrated control system may further include a second menu providing portion that scrolls menu buttons, included in an enabled menu and used to control functions of an in-vehicle device, in a second direction so that the scrolled menu buttons are displayed within the menu portion.

The first menu providing portion may include a touchpad-type scroll button that provides haptic feedback, a scroll wheel having a physical structure, a touchpad-type scroll button, or a trackball-type scroll wheel.

The second menu providing portion may include a touchpad-type scroll button that provides haptic feedback, a scroll wheel having a physical structure, a touchpad-type scroll button, or a trackball-type scroll wheel.

The menu portion may include at least two of a navigation menu part, a phone menu part, a radio menu part, and an air-conditioning menu part.

The menu buttons may include at least two function buttons. The menu buttons may include at least two menu buttons. The menu buttons may be physical display buttons that can be pushed or touch screen display buttons.

The menu portions may be rectangular, pentagonal, or hexagonal.

A layout structure formed by the first menu providing portion, the second menu providing portion, and the menu buttons may be an N×N lattice structure or an M×N lattice structure.

When the menu buttons include touch screen-type buttons, the N×N lattice structure may be replaced with a (N+1)×(N+1) lattice structure, or the N×N lattice structure may be replaced with the M×N lattice structure or vice versa, based on the menu mode of the menu portion.

When the menu portion, the first menu providing portion, the second menu providing portion, and the menu buttons each include touch-sensitive display units, a layout structure formed by the first menu providing portion, the second menu providing portion, and the menu buttons may be an N×N asymmetrical lattice structure or an M×N asymmetrical lattice structure.

The N×N asymmetrical lattice structure may be replaced with a (N+1)×(N+1) asymmetrical lattice structure, or the N×N asymmetrical lattice structure may be replaced with the M×N asymmetrical lattice structure or vice versa, based on the menu mode of the menu portion.

Furthermore, according to embodiments of the present disclosure provides a concentrated control system for a vehicle, the system including: a display portion that displays menu modes associated with devices in the vehicle; a menu portion that enables one of the menu modes by rotating the display portion; and a menu providing portion that, when an enabled menu mode is determined by the menu portion, displays menu buttons included in the enabled menu mode that controls functions of an in-vehicle device by rotating the menu buttons displayed by the display portion.

The menu providing portion may rotate together with the menu portion and display the menu buttons.

The menu providing portion and the menu portion, in order, may be located under the display portion.

The menu buttons may include first function buttons most frequently used in the menu mode and second function buttons that need to be immediately used in the menu mode.

The first function buttons each may include at least one additional function button that is included in the menu buttons and appears when the first function buttons are pressed.

The concentrated control system may further include a reference display portion displaying the enabled menu.

Accordingly, the concentrated control system for a vehicle according to the present disclosure makes it easier to move through menus and select them, in comparison to conventional concentrated control systems having a dial knob or a touchpad type structure. The ease of scrolling through and selecting menus can improve driver convenience and reduce driver distractions, thus contributing to the improvement of the safety of vehicle driving.

Moreover, a touch-screen type device (e.g., button) that can recognize handwriting is employed according to the present disclosure, which can reduce the inconvenience of text-typing, which is one of the problems conventional control systems consisting of a combination of a dial knob and buttons face. Being a single system that may include a touchpad, the concentrated control system according to the present disclosure may be made smaller in size and minimize the driver's hand movement to use the system. In addition, the present disclosure allows for replacing the same button (e.g., menu button) at the same position with other function buttons depending on which menu or mode is enabled, thereby minimizing the number of buttons. As a result, the volume of the concentrated control system according to the present disclosure can be reduced.

BRIEF DESCRIPTION OF THE DRAWINGS

In order to more fully understand the drawings used in the detailed description of the disclosure, a brief description of the drawings is provided.

DETAILED DESCRIPTION OF THE EMBODIMENTS

Figure 1:
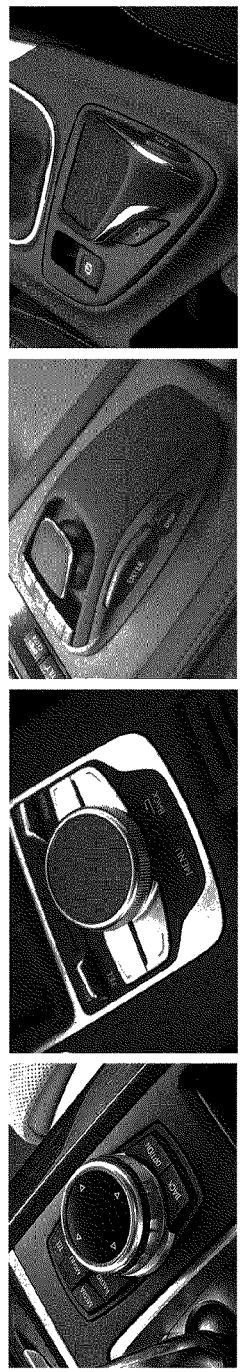
FIG. 1 is a view showing an example of a central concentrated control system for a vehicle.

For a better understanding of the present disclosure, and to show more clearly how it may be carried into effect, reference will now be made, by way of example, to the accompanying drawings which show embodiments of the present disclosure.

Hereinafter, embodiments of the present disclosure will be described in detail with reference to the accompanying drawings. In describing the embodiments of the present disclosure, a detailed description of pertinent known constructions or functions will be omitted if it is deemed to make the gist of the present disclosure unnecessarily vague. Wherever possible, the same reference numbers will be used throughout the drawings to refer to the same or like parts.

The terms used in the specification are used to describe only specific embodiments and are not intended to limit the present disclosure. Singular forms are intended to include plural forms unless the context clearly indicates otherwise. It will be further understood that the terms "include", "comprise" or "have" used in this specification specify the presence of stated features, steps, operations, components, parts, or a combination thereof, but do not preclude the presence or addition of one or more other features, numerals, steps, operations, components, parts, or a combination thereof.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art.

Unless indicated otherwise, it is to be understood that all the terms used in the specification including technical and scientific terms have the same meaning as those that are understood by those who are skilled in the art. It must be understood that the terms defined by the dictionary are identical with the meanings within the context of the related art, and they should not be ideally or excessively formally defined unless the context clearly dictates otherwise.

Referring now to the disclosed embodiments, preventing driver distractions while driving and ensuring driver safety have always been recognized as important issues. To solve this issue, many techniques and systems have been developed. One of these systems includes a central concentrated control system that is mounted near a car's armrest and gear knob to indirectly control an audio-video-navigation (AVN) display or an air conditioning system. Since the central concentrated control system is counterintuitive compared to directly controlling the AVN and air-conditioning control buttons located on the center console, drivers may find it hard to handle it, especially if they are novice drivers. Nevertheless, various tests have proven that controlling the AVN and air-conditioning buttons using a central concentrated control system, rather than directly controlling them, can reduce drive distractions and improve convenience.

Through this research, many original equipment manufacturers (OEMs), like Mercedes-Benz, BMW, Toyota/Lexus, etc., have been equipping vehicles with a central concentrated control system. Further, as shown in (a) and (b) of FIG. 1, most central concentrated control systems such as BMW iDrive consist of a combination of a dial knob for menu navigation and volume control and buttons for function selection. These buttons may be buttons for category selection and item selection. Other OEMs are investing heavily in developing other types of central concentrated control systems to incorporate the operability of the central concentrated control system and create distinctive images. These OEMs introduced systems, such as Lexus Remote Touch, a mouse-style control system, shown in (c) of FIG. 1, and Opel's Touch Pad shown in (d) of FIG. 1, that differ from previous systems made by the leading OEMs, breaking away from their system structures. For instance, Opel's Touch Pad may consist of a touchpad and a minimum number of about three buttons.

Of the central concentrated control systems introduced so far, control systems consisting of a combination of a dial knob and buttons have operability and an intuitive structure. However, these types of control systems have become too common. Lexus Remote Touch and Opel's Touch Pad are distinguished from the existing central concentrated control systems, yet they can be lacking in operability, compared to the control systems consisting of a combination of a dial knob and buttons. Lexus Remote Touch can be unstable and inaccurate, in comparison to moving through menus using the dial knob's tilting function or the buttons while driving. Meanwhile, Opel's Touch Pad can have disadvantages in repeatability, such as having to make a lot of flicking gestures when jumping several menus at a time and in terms of time taken to access functions.

Figure 4:
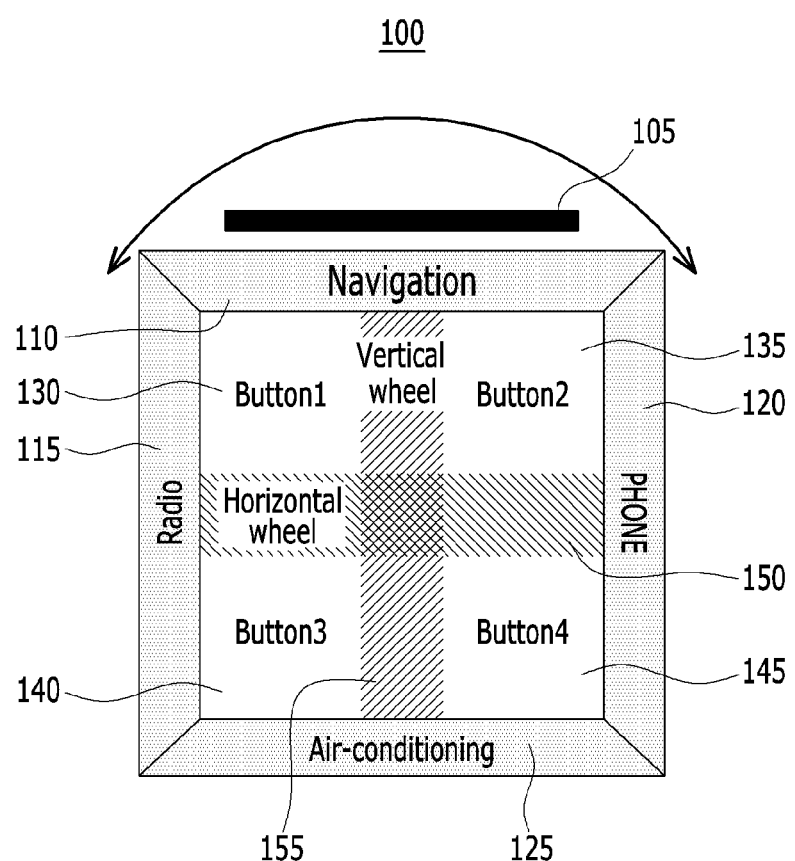
FIG. 4 is a view for explaining a concentrated control system for a vehicle according to embodiments of the present disclosure.

FIG. 4 is a view for explaining a concentrated control system for a vehicle according to embodiments of the present disclosure. The concentrated control system (or the concentrated manipulation system) 100 may be referred to as a cube-type central concentrated control system for a vehicle.

As shown in FIG. 4, the concentrated control system (or the vehicle's concentrated controller) 100 is an Man Machine Interface (MMI) system and may include a menu portion including a navigation menu part 110, a radio menu part 115, a phone menu part 120, and an air-conditioning menu part 125, a first menu providing portion including a reference display portion (or a reference indicator) 105 and a vertical scroll wheel 155, and a second menu providing portion including a horizontal scroll wheel 150. The radio menu part 115 may be replaced with an audio menu part. Alternatively, the vertical scroll wheel 155 or the horizontal scroll wheel 150 may be omitted, and the menu portion may include at least two out of the navigation menu part 110, the radio menu part 115, the phone menu part 120, the and the air-conditioning menu part 125.

Figure 2:
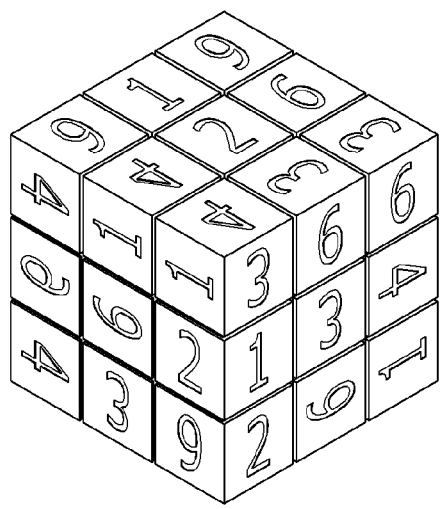
FIG. 2 is a view showing a cube which is similar to the structure of a concentrated control system for a vehicle according to the present disclosure.
Figure 3:
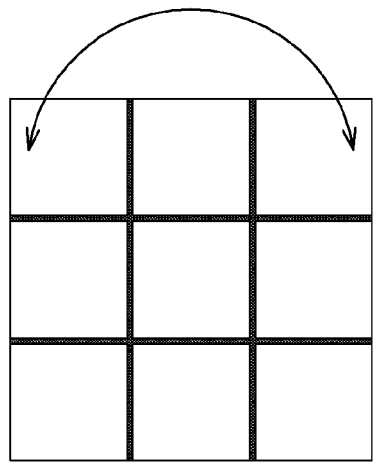
FIG. 3 is a view showing a lattice structure which is similar to the structure of a concentrated control system for a vehicle according to the present disclosure.

The structure of the concentrated control system 100 may be similar to the structure of a cube shown in FIG. 2. The difference is that, while the cube is a regular hexahedron and each of the pieces can be moved up, down, left, and right, the concentrated control system 100 has a single-layer structure in which only the top plate can be rotated. That is, as shown in FIGS. 3 and 4, the concentrated control system 100 may have a structure with a lattice-like plate being rotatable to the left and right as indicated by a double arrow. The concentrated control system 100 may have various patterns other than the lattice pattern.

A control method for the concentrated control system 100 for a vehicle will be described below.

If the concentrated control system 100 has a rectangular lattice structure as shown in FIG. 4, each menu part on the lattice structure may indicate a top menu, and any of the top menus can be selected by rotating the entire plate (menu portion or menu plate). In this instance, the reference display portion 105 for displaying a pattern or mark that is formed using light emitting diodes (LEDs) may be provided to show a reference menu to the user or the driver.

The scroll wheels 150 and 155 are located horizontally and vertically in the middle of the concentrated control system 100. The vertical scroll wheel may be used for moving vertical menus or vertical items, and the horizontal scroll wheel may be used for moving horizontal menus or horizontal items. The menu buttons located near upper, lower, left, and right corners within the menu portion are used as multipurpose buttons. The buttons may be displayable buttons, in order to keep the text within the buttons from rotating when the concentrated control system 100 is rotated.

The menu portion may provide menu modes associated with devices contained in the vehicle when rotated with the user's hand. For example, the in-vehicle devices may include a navigation device, a radio device, an audio device, a phone device, an air-conditioning system, or a healthcare device. The top menus may be determined depending on how the menu portion is rotated. The menu portion may indicate the functions of the top menus. The top menus may be indicated by menu names, pictures, or icons, as shown in FIG. 4.

The reference display portion 105 may display an enabled menu out of the menu modes. The reference display portion 105 is a display portion that shows an enabled menu as a reference to the user, and may display the enabled menu in a pattern or picture by using LEDs.

The vertical scroll wheel 155 contained in the first menu providing portion (e.g., menu selecting portion or scrolling device) may scroll menu buttons (e.g., a first button 130, a second button 135, a third button 140, a fourth button 145, etc.) included in the enabled menu and used to control the functions of an in-vehicle device, in a first direction (e.g., vertically) so that the scrolled menu buttons are displayed within the menu portion. The vertical scroll wheel 155 may scroll menu buttons vertically. Additionally, the menu buttons may include at least two menu buttons (e.g., the first button 130 and the second button 135).

The menu buttons may be buttons that control the corresponding functions (e.g., the functions associated with an in-vehicle device included in the top menu) when the top menu is selected. The buttons may be displayable buttons whose names can be changed, because, when the menu portion is rotated, the text (i.e., menu names) displayed in the buttons is not rotated and the functions of the button change depending on which menu of the menu portion is enabled.

More specifically, the menu buttons are keys for setting the functions of an in-vehicle device, which may be located at the corners of the menu portion and used as keys for selecting submenus or executing functions. The menu buttons may be physical display buttons that can be pushed, or touch screen display buttons that can sense the user's or driver's touch, in order to keep the text in the menu buttons from rotating when the concentrated control system 100 is rotated.

The first menu providing portion may include a touchpad-type scroll button that provides haptic feedback, a scroll wheel that have a physical structure, a touchpad-type scroll button, or a trackball-type scroll wheel (or a scroll button).

The horizontal scroll wheel contained in the second menu providing portion may scroll menu buttons, included in an enabled menu and used to control the functions of an in-vehicle device, in a second direction (e.g., horizontally) so that the scrolled menu buttons are displayed within the menu portion. The horizontal scroll wheel 155 may scroll menu buttons (e.g., list buttons) horizontally.

The second menu providing portion may include a touchpad-type scroll button that provides haptic feedback, a scroll wheel that have a physical structure, a touchpad-type scroll button, or a trackball-type scroll wheel (or a scroll button).

The vertical scroll wheel 155 and the horizontal scroll wheel 150 cross each other, and may be designed in such a way that the user's index finger or middle finger can easily reach both of the two scroll wheels 155 and 150 while the user's hand sits on the concentrated control system 100.

Figure 5:
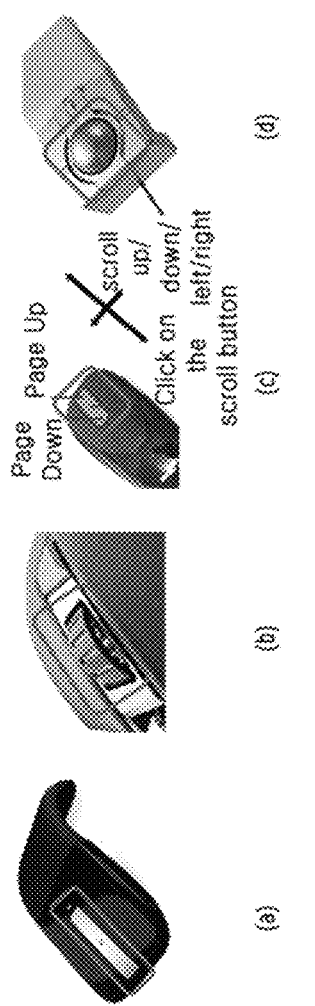
FIG. 5 is a view for explaining an example of the first menu providing portion including the vertical scroll wheel or of the second menu providing portion including the horizontal scroll wheel, illustrated in FIG. 4.

FIG. 5 is a view for explaining an example of the first menu providing portion including the vertical scroll wheel or of the second menu providing portion including the horizontal scroll wheel, illustrated in FIG. 4.

Referring to FIG. 5, four types of menu providing portions (e.g., menu selecting portions) are illustrated. A touchpad-type scroll button that provides haptic feedback, which is the menu providing portion shown in (a) of FIG. 5, may deliver sensations of scroll amount and scroll increments to the user through haptic feedback. The scroll wheel, which is the menu providing portion shown in (b) of FIG. 5, may be a scrolling device that has a physical structure.

The menu providing portion shown in (c) of FIG. 5 includes the touchpad-type scroll button shown in (a) of FIG. 5 (*c*), but may not provide haptic feedback. The touchpad-type scroll button does not detect scroll amount based on how many increments or degrees it is rotated, like the scroll wheel shown in (b) of FIG. 5, but may adjust scroll speed and scroll increments based on horizontal scroll speed, vertical scroll speed, touch time, etc. The menu providing portion shown in (d) of FIG. 5 uses a trackball-type device, and yet may use the trackball as a scroll input device by enabling the trackball to move only horizontally and vertically.

The conventional buttons shown in FIG. 1 require repeated operations when moving through numerous menus, are far from giving accurate feedback about how much they have moved when pushed long for continuous navigation and are not especially distinctive in terms of design. The dial knob requires the user to use several fingers and the whole wrist to make adjustments, and it is hard to control horizontal and vertical movements simultaneously.

On the other hand, the vertical scroll wheel 155 of the present disclosure may allow the user to get accurate feedback and scroll through menus or lists, with a minimum of movement (i.e., by simply moving one finger up and down). The horizontal scroll wheel 150 also may allow the user to scroll through menus with less movement than with the dial knob. Moreover, the scroll devices' small size may save space by integrating the horizontal scroll wheel and the vertical scroll wheel, and make it easy to control horizontal and vertical movements simultaneously with a minimum of hand movement.

While the above-described concentrated control system 100 for the vehicle has a 3×3 lattice structure, it may have an N×N lattice structure such as a 4×4 or 5×5 lattice structure or an M×N lattice structure such as a 3×4, 3×5, or 4×3 lattice structure according to embodiments of the present disclosure. Furthermore, while the concentrated control system 100 includes a rectangular menu portion, it may include a triangular, pentagonal, or hexagonal menu portion according to embodiments of the present disclosure.

The concentrated control system according to the present disclosure enables fast submenu selection by including the above-described components, and minimizes the number of buttons as the use of the buttons can be changed depending on the situation (i.e., the functions of the in-vehicle devices). Moreover, the present disclosure can create distinctive images by providing a system having a different configuration from the existing control systems.

Figure 6:
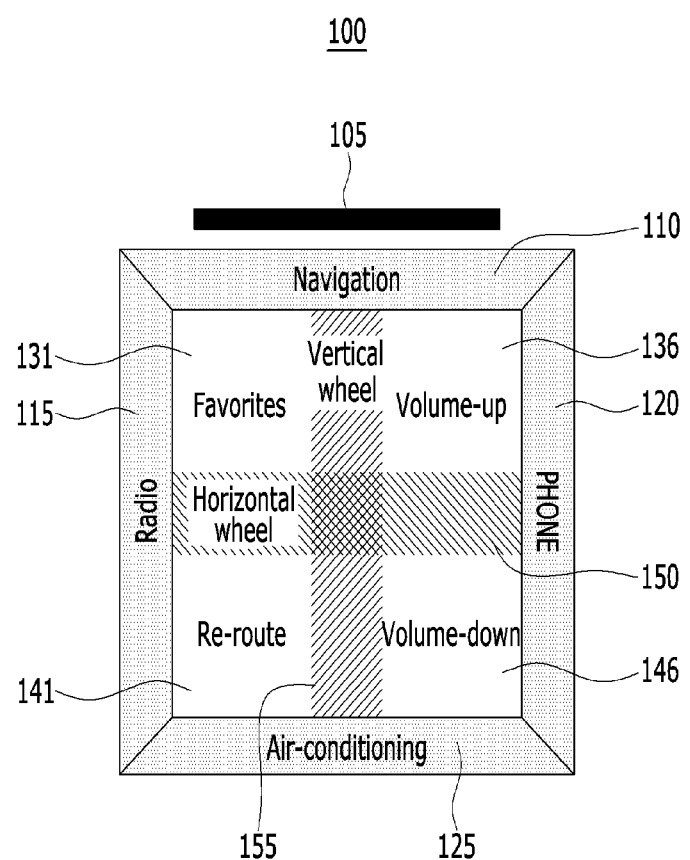
FIG. 6, FIG. 7, and FIG. 8 are views for explaining an example of the menu buttons shown in FIG. 4.
Figure 7:
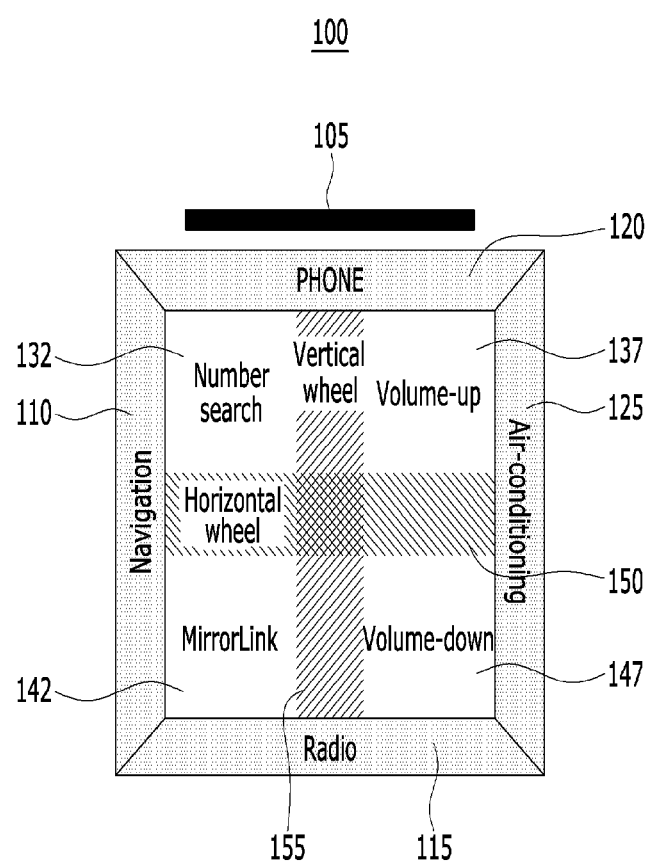
Figure 8:
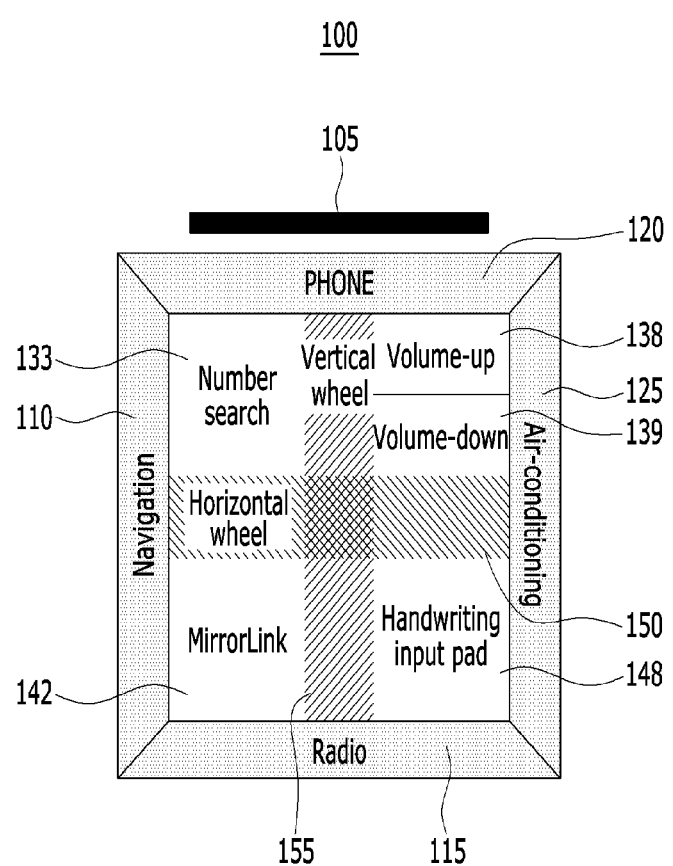

FIG. 6, FIG. 7, and FIG. 8 are views for explaining an example of the menu buttons shown in FIG. 4, as described in further detail below.

FIG. 6 is a view for explaining the menu portion of FIG. 4 that is enabled in navigation mode. As shown in FIG. 6, the menu buttons in navigation mode may include a Favorites button 131, a Volume-up button 136, a Re-route button 141, and a Volume-down button 146.

FIG. 7 is a view for explaining the menu portion of FIG. 4 that is enabled in phone mode. As shown in FIG. 7, the menu buttons in phone mode may include a Number search button 132, a Volume-up button 137, a MirrorLink button 142, and a Volume-down button 147. MirrorLink may be an international standard technology that offers integration between a smartphone and a car's infotainment system.

FIG. 8 is a view for explaining another example of the menu portion of FIG. 4 that is enabled in phone mode. As shown in FIG. 8, the menu buttons in phone mode may include a Find number button 133, a Volume-up button 138, a Volume-down button 139, a MirrorLink button 142, and a Handwriting input pad 148. The function of the Find number button may be identical to the function of the Number search function 132 shown in FIG. 7.

Referring again to FIG. 6, FIG. 7, and FIG. 8, different buttons (e.g., the Favorites button of FIG. 6 and the Number search button of FIG. 7) at the same position may perform different functions depending on the mode, and the same button at different positions (e.g., the Volume-up button shown in FIGS. 6 and 8) must be displayed anew even if it performs the same function. The menu buttons need to be displayable buttons because the text displayed in the menu buttons need to be shown as it is to the user, without being rotated, as shown in FIGS. 6, 7, and 8, even if the menu portion is rotated. Displayable buttons are necessary because, if a top menu is changed, the function of a particular button may have to be replaced with other functions and one button may have to perform multiple functions. For example, the Favorites button in navigation mode of FIG. 6 may be replaced with the Number search button in phone mode of FIG. 7.

If the menu portion is rotated, the number of menu buttons provided by the horizontal scroll wheel and the vertical scroll wheel may be changed. Further, if the menu buttons are embodied as a touch screen or touchpad that can be touched, one button may be divided into the Volume-up button 138 and the Volume-down button 139, as shown in FIG. 8. That is, each of the menu buttons may be divided into at least two function buttons. The boundary portion between the Volume-up button 138 and the Volume-down button 139, shown in FIG. 8, is a visual representation of a boundary, and the user may perceive it as being different from a physical boundary.

However, if a button that can be displayed but has to be selected by pushing (i.e., a push-type display button) is divided as shown in FIG. 8, the button structure becomes complicated when it is rotated, thus causing confusion for the user. Accordingly, in the present disclosure, the function buttons (e.g., menu buttons) shown in FIG. 8 may be divided only when they are touchpad-type buttons or touchscreen-type buttons.

Figure 9:
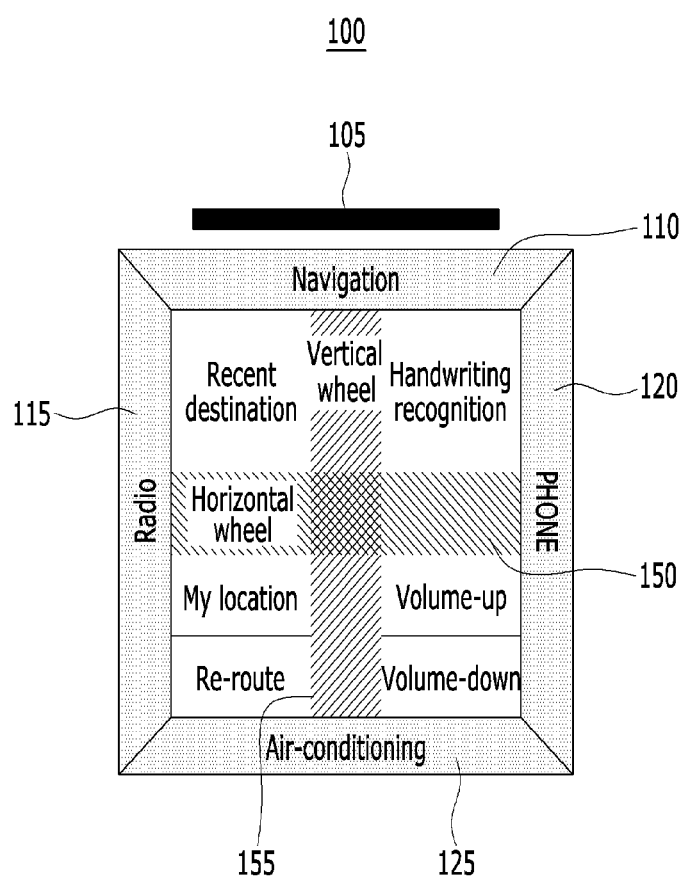
FIG. 9 and FIG. 10 are views for explaining another example of the menu buttons shown in FIG. 4.
Figure 10:
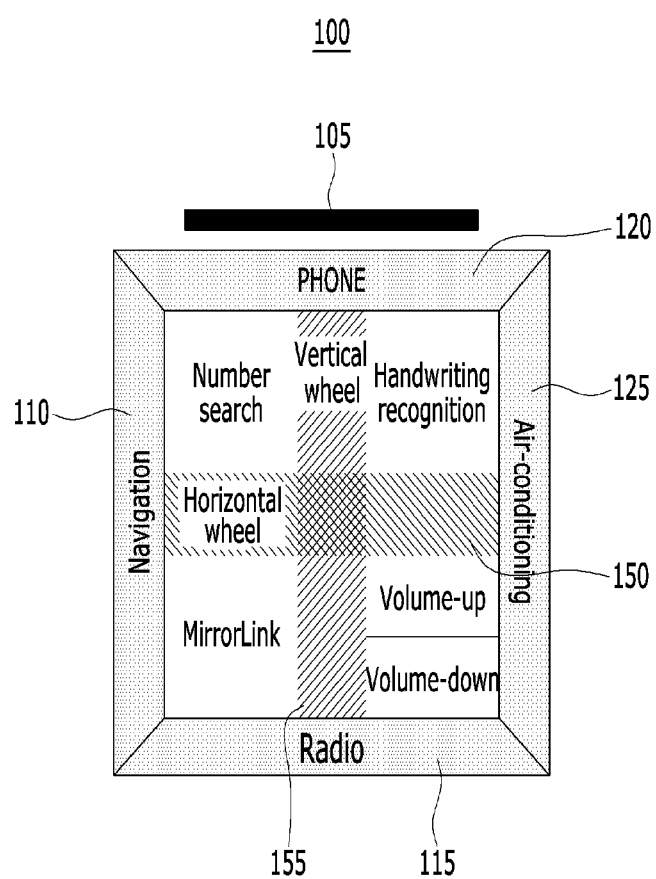

FIG. 9 and FIG. 10 are views for explaining another example of the menu buttons shown in FIG. 4, as described in further detail below.

FIG. 9 is a view for explaining the menu portion of FIG. 4 that is enabled in navigation mode. As shown in FIG. 9, the menu buttons in navigation mode may include a Recent destination button, a Handwriting recognition button, a My location button (e.g., a "Find my location" button), a Re-route button, a Volume-up button, and a Volume-down button.

FIG. 10 is a view for explaining the menu portion of FIG. 4 that is enabled in phone mode. As shown in FIG. 10, the menu buttons in phone mode may include a Find number button, a Handwriting recognition button, a MirrorLink button, Volume-up button, and a Volume-down button 1.

Referring again to FIG. 9 and FIG. 10, various types of buttons may be used as the menu buttons depending on the menu mode or the function of the menu mode, as long as they can be displayed and receive touch input. For example, one button at a particular position may be divided into the Volume-up button and the Volume-down button because these two buttons have to be accessed from anywhere regardless of the mode. In navigation mode, one button is functionally divided into the My location button and the Re-route button because more functions than the number of buttons have to be accessed directly. On the contrary, in phone mode, the corresponding button may be replaced with one function button "MirrorLink". More specifically, the same button at the same position may be functionally divided or used as a whole, depending on which mode is current enabled. Some buttons may always provide the same function regardless of the mode.

As described above, some buttons may be accessed in any mode depending on the characteristics, types, or modes of the functions, or some buttons each may be divided or used as a whole depending on the mode. Further, the present disclosure may provide distinctive images and allow the user to move through menus and select them with a minimum of movement by providing a system having a different configuration and structure from the central concentrated control system of FIG. 1, and provide a minimum number of buttons with maximum functions since the same button at the same position may be used for other purposes depending on the situation.

Figure 11:
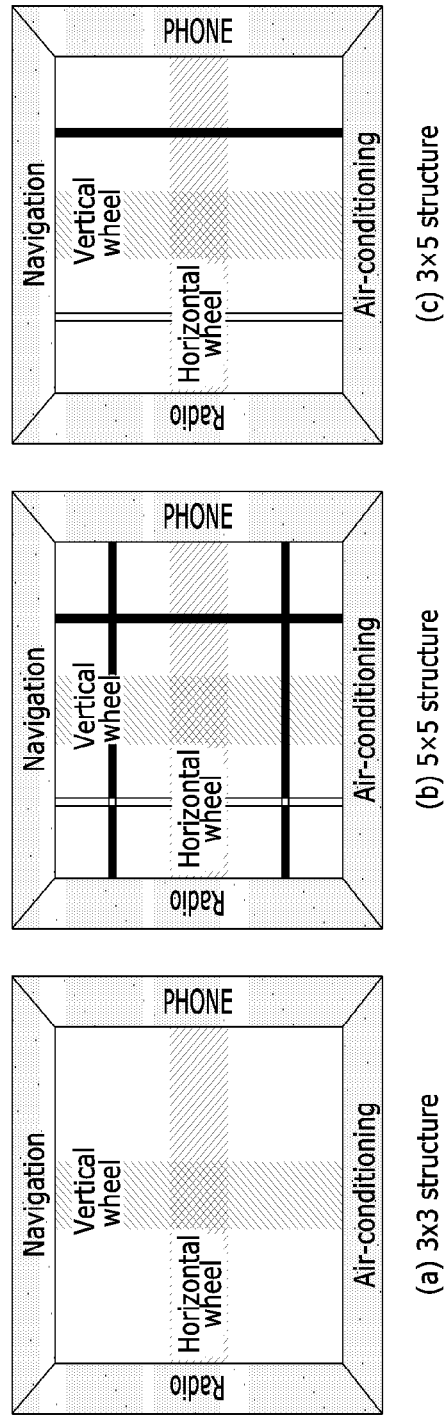
FIG. 11 is a view for explaining a concentrated control system for a vehicle according to embodiments of the present disclosure.

FIG. 11 is a view for explaining a concentrated control system for a vehicle according to embodiments of the present disclosure. As shown in FIG. 11, the concentrated control system may have a N×N lattice structure (i.e., symmetrical lattice structure) such as a 3×3, 4×4, or 5×5 structure shown in FIG. 4, or an M×N lattice structure such as a 3×4 structure according to another exemplary embodiment of the present disclosure. The N×N lattice structure and the M×N lattice structure each may include components having similar functions to the functions of the menu portion, first menu providing portion, second menu providing portion, and menu buttons included in the 3×3 structure. A layout structure formed by the first menu providing portion, the second menu providing portion, and the menu buttons may be an N rows×N columns lattice structure (i.e., N×N symmetrical lattice structure) or an M×N lattice structure (i.e., M×N symmetrical lattice structure).

If touch-sensitive displays are used as the menu buttons, the present disclosure allows for replacing the N×N structure with the M×N structure or vice versa depending on the situation, like replacing the 3×3 structure with the 4×5 structure or the 5×5 structure. That is, the lattice structure may be changed for display to the user depending on the situation (e.g., mode or function). More specifically, if the menu buttons include touch screen-type buttons, the N×N lattice structure may be replaced with a (N+1)×(N+1) lattice structure, or the N×N lattice structure may be replaced with the M×N lattice structure or vice versa, depending on the menu mode of the menu portion.

Figure 12:
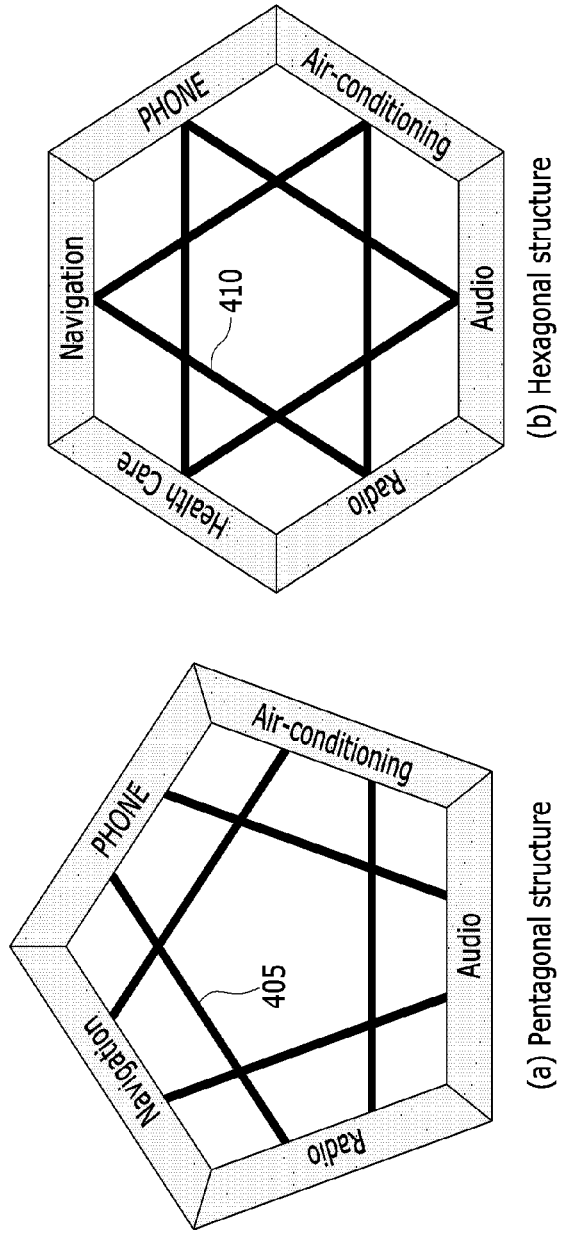
FIG. 12 is a view for explaining a concentrated control system for a vehicle according to embodiments of the present disclosure.

FIG. 12 is a view for explaining a concentrated control system for a vehicle according to embodiments of the present disclosure. As shown in, FIG. 12, the menu portion of FIG. 4 may be embodied in a variety of polygonal structures such as a pentagonal or hexagonal structure, rather than in a rectangular structure. The pentagonal structure may include a navigation menu part, a radio menu part, an audio menu part, a phone menu part, and an air-conditioning menu part. The hexagonal structure may include a navigation menu part, a radio menu part, an audio menu part, a phone menu part, an air-conditioning menu part, and a healthcare menu part. The polygonal structures each may include components having similar functions to the functions of the menu portion, first menu providing portion, second menu providing portion, and menu buttons included in the rectangular structure.

In the polygonal structures except the rectangular structure, the angle of a horizontal wheel 405 or 410 or of a vertical wheel may be misaligned when the menu portion is rotated. Accordingly, if the menu portion is made in the polygonal structures except the rectangular structure, the horizontal wheel 405 or 410 or the vertical wheel include a touchpad type scroll button or a trackball-type scroll wheel, rather than the physical scroll wheel shown in (b) of FIG. 5.

Figure 13:
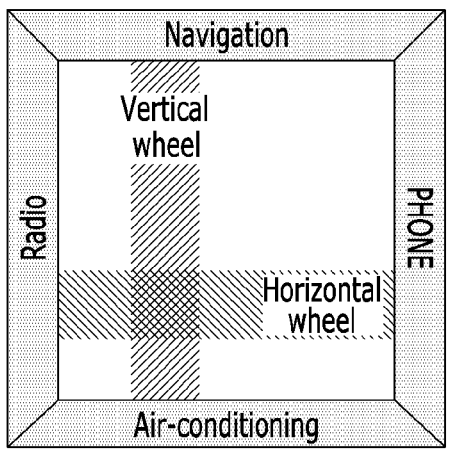
FIG. 13 is a view for explaining a concentrated control system for a vehicle according to embodiments of the present disclosure.
Figure 13:
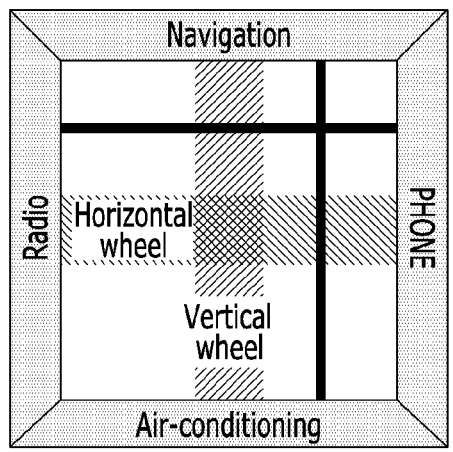

FIG. 13 is a view for explaining a concentrated control system for a vehicle according to embodiments of the present disclosure. As shown in FIG. 13, a concentrated control system for a vehicle has an asymmetrical lattice structure such as a 3×3 asymmetrical structure or a 4×4 asymmetrical structure according to the exemplary embodiment of the present disclosure. The asymmetrical lattice structure may include components having similar functions to the functions of the menu portion, first menu providing portion, second menu providing portion, and menu buttons shown in FIG. 4. If the menu portion, the first menu providing portion, the second menu providing portion, and the menu buttons are embodied as and include touch-sensitive display units individually, a layout structure formed by the first menu providing portion, the second menu providing portion, and the menu buttons may be an N×N asymmetrical lattice structure or an M×N asymmetrical lattice structure. The menu portion, the first menu providing portion, the second menu providing portion, and the menu buttons may be displayed by an in-vehicle display device such as a liquid crystal display (LCD).

In the asymmetrical lattice structure, if the plate of the concentrated control system is entirely made as a touch-sensitive display module, the asymmetrical structure of the concentrated control system may be kept the same even if the menu portion is rotated. That is, if the asymmetrical lattice structure is made as a touch display module, the menu portion, first menu providing portion, second menu providing portion, and menu buttons that can sense the user's finger touch may be graphically displayed.

Using the above-described configuration (or method), if the mode changes from navigation mode to phone mode, for example, the layout of display may be changed to the asymmetrical structure of FIG. 13 and the names of the menu buttons may be changed according to phone mode. As described above, if the asymmetrical structure is graphically represented on a touch display, the N×N asymmetrical lattice structure may be easily replaced with the (N+1)×(N+1) asymmetrical lattice structure, or the N×N asymmetrical lattice structure may be easily replaced with the M×N asymmetrical lattice structure or vice versa, depending on the menu mode of the menu portion. Accordingly, confusion and/or inconvenience for the user caused by rotation of an asymmetrical structure of the concentrated control system may be prevented.

Displaying of an asymmetrical structure may be performed by a controller of the display device. The controller may perform the functions of a central processing unit (CPU) (i.e., processor) and control the overall operations of the internal components of the display device. The controller may include a program containing a series of commands for performing displaying of an asymmetrical structure of the concentrated control system according to the present disclosure.

Figure 14:
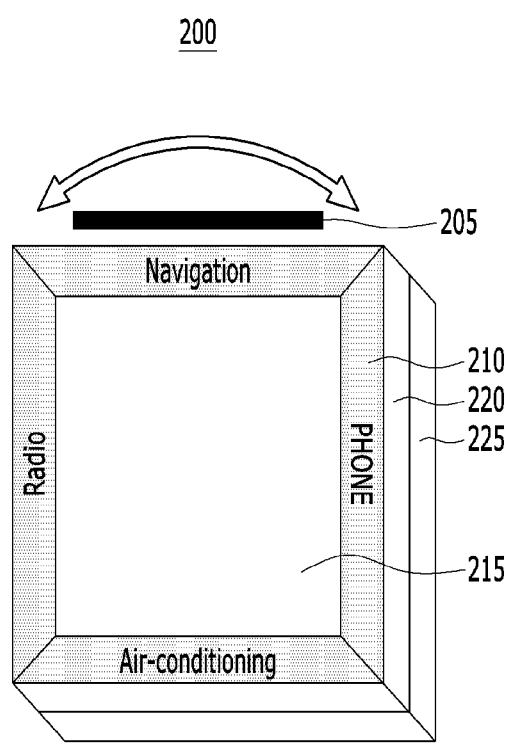
FIG. 14 is a view for explaining a concentrated control system for a vehicle according to embodiments of the present disclosure.

FIG. 14 is a view for explaining a concentrated control system for a vehicle according to embodiments of the present disclosure. As shown in FIG. 14, the concentrated control system 200 is a three-dimensional control system or a multiplane control system, and may include a reference display portion 205, a display portion 210, a menu providing portion 220, and a menu portion 225. In another exemplary embodiment of the present disclosure, the reference display portion 205 may be omitted.

The display portion 210 may display menu modes associated with devices contained in the vehicle. For example, the menu modes may include navigation mode, radio mode, phone mode, and air-conditioning mode. For example, the in-vehicle devices may include a navigation device, a radio device, an audio device, a phone device, or an air-conditioning system.

The menu portion 225 is a main menu control plane, and any one of the menu modes may be enabled by rotating the display portion 210, as shown in FIG. 14. That is, in the concentrated control system 200 having a cube structure, when the main menu control plane is rotated, the top menus such as navigation mode, phone mode, radio mode, or air-conditioning mode may be selected.

The menu providing portion 220 is a submenu control plane. When the enabled menu mode is determined by the menu portion 225, menu buttons included in the enabled menu mode that control the functions of an in-vehicle device may be displayed on the inside 215 of the menu modes by rotating the menu buttons 215 included in the display portion 210 as shown in FIG. 14. That is, when a top menu is selected by the main menu control plane, the sub-functions of the menu mode may be selected by the submenu control plane.

The menu providing portion 220 may rotate together with the menu portion 225 and display the menu button (e.g., Destination search button (230 of FIG. 15) of the navigation mode). As the submenu control plane on the top plate rotates together with the menu portion 225 on the bottom plate, this structure provides convenience to the user.

Figure 15:
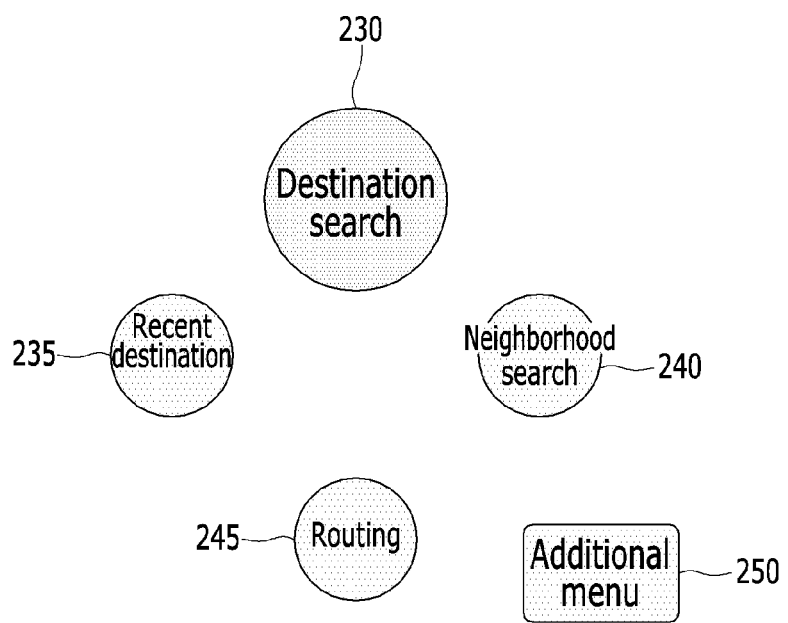
FIG. 15 is a view for explaining examples of menu buttons displayed by the menu providing portion of FIG. 14.

FIG. 15 is a view for explaining examples of menu buttons displayed by the menu providing portion of FIG. 14. As shown in FIG. 15, examples of the menu buttons may include first function buttons, such as a Destination search function button 230, a Recent destination function button 235, a Neighborhood search function 240, and a Routing function button 245 in navigation mode, that are most frequently used in the menu mode, and second function buttons (e.g., Re-route function button), such as an Add menu function button 250, that need to be immediately used in the menu mode. The first function buttons may include four most frequently used buttons.

More specifically, the menu buttons may include first function buttons most frequently used in the menu mode, and second function buttons that need to be immediately used in the menu mode. The first function buttons each may include at least one additional function button (e.g., a Select destination function that is displayed when the Destination search function 230 is pressed) that is included in the menu buttons and appears when the first function buttons are pressed.

The submenus of the menu mode, such as the Destination search function button 230, the Recent destination function button 235, the Neighborhood search function 240, and the Routing function 245, correspond to the lateral sides of the concentrated control system 200 having a cube structure, respectively, and the number of submenus may be four. Other menu modes like radio mode may include menu buttons having a similar structure to that of the menu buttons for navigation mode.

The menu providing portion 220 may display the submenus of navigation mode, such as the Destination search function button 230, the Recent Destination function button 235, the Neighborhood search function button 240, and the Routing button 245, on a user interface (UI) such as a graphical user interface (GUI). As the user can select submenus on the GUI, it is possible for them to operate the concentrated control system 200 in a convenient way.

As described above, the concentrated control system 200 may serve as an organic concentrated control system that minimizes user distractions, by including the main menu control plane 225, the submenu control plane 220, and the display-type menu buttons (e.g., touch screen-type buttons). Referring again to FIG. 14, the menu providing portion 220 and the menu portion 225 may be located under the display portion 210 in the order listed. In another exemplary embodiment of the present disclosure, the menu portion 225 and the menu providing portion 220 may be located under the display portion 210 in the order listed.

The reference display portion 205 may display an enabled menu mode. The reference display portion 205 is a display portion that shows an enabled menu as a reference to the user, and may display the enabled menu in a pattern or picture by using LEDs.

The concentrated control system 200 may have a two-layer structure including a menu providing portion 220 and a menu portion 225. The menu providing portion 220, which is the submenu control plane, may be divided into two, or may have a three-layer structure according to embodiments of the present disclosure. The concentrated control system 200 may have a structure including a rectangular display portion 210, a menu providing portion 220, and a menu portion 225. Alternatively, the concentrated control system 200 may have a structure including a display portion having a polygonal shape like a pentagonal shape, a menu providing portion, and a menu portion.

The concentrated control system having a polygonal cube structure according to the present disclosure described above has the following benefits. The central concentrated control system having a circular, rotary dial knob shown in (a) and (b) of FIG. 1 may provide auditory feedback with a tick-tick sound for each increment, or haptic feedback. However, since each increment of rotation is minute, it could be hard for the user to figure out how many menus the dial is moving through when selecting a menu. Accordingly, when selecting a menu in a circular dial structure, the user needs to make sure that the dial is correctly at the menu selected.

On the other hand, the concentrated control system having a polygonal structure according to the present disclosure includes a menu control plane which allows the user to figure out the degree of rotation of the control plane (or the regulation face) user experience (UX) reveal that the user can figure out whether any of four or five planes rotates or not, without seeing these planes. If the user is not familiar with a GUI structure of this disclosure, the user needs to operate the concentrated control system 200 after gazing the GUI. Once the user gets used to the GUI structure, the user can easily perceive menu scroll increments and where the menus are located, without seeing the GUI.

The components, units, blocks, or modules used in the present exemplary embodiment may be implemented by software components, such as tasks, classes, subroutines, processes, objects, execution threads, or programs, or by hardware components, such as Field Programmable Gate Array (FPGA) or Application Specific Integrated Circuit (ASIC), or by combinations of the software and hardware components. The components may be included in a computer-readable storage medium, or some of the components may be distributed in a plurality of computers.

As described above, the optimum embodiments have been disclosed in the drawings and the specification. Although the specific terms have been used herein, they have been used merely for the purpose of describing the present disclosure, and have not been used to limit the meanings thereof and the scope of the present disclosure set forth in the claims. Therefore, it will be understood by those having ordinary knowledge in the art that various modifications and other equivalent embodiments can be made. Accordingly, the true technical protection range of this disclosure should be defined by the technical spirit of the attached claims.

DESCRIPTION OF SYMBOLS

105: reference display portion
110: navigation mode
115: radio mode
120: phone mode
125: air-conditioning mode
130: first function button
135: second function button
140: third function button
145: fourth function button

What is claimed is:
1. A concentrated control system for a vehicle, the system comprising:
  a menu portion that, when rotated, provides menu modes associated with devices in the vehicle;
  a first menu providing portion that scrolls menu buttons, included in an enabled menu and used to control functions of an in-vehicle device, in a first direction so that the scrolled menu buttons are displayed within the menu portion;
  a reference display portion displaying the enabled menu; and
  a second menu providing portion that scrolls menu buttons, included in the enabled menu and used to control the functions of the in-vehicle device, in a second direction so that the scrolled menu buttons are displayed within the menu portion, wherein
  the first menu providing portion is disposed within the menu portion, and
  the first menu providing portion and the second menu providing portion cross each other.

2. The concentrated control system of claim 1, wherein the first menu providing portion includes a touchpad-type scroll button that provides haptic feedback, a scroll wheel having a physical structure, a touchpad-type scroll button, or a trackball-type scroll wheel.

3. The concentrated control system of claim 1, wherein the second menu providing portion includes a touchpad-type scroll button that provides haptic feedback, a scroll wheel having a physical structure, a touchpad-type scroll button, or a trackball-type scroll wheel.

4. The concentrated control system of claim 1, wherein the menu portion includes at least two of a navigation menu part, a phone menu part, a radio menu part, and an air-conditioning menu part.

5. The concentrated control system of claim 1, wherein the menu buttons include at least two function buttons.

6. The concentrated control system of claim 1, wherein the menu buttons include at least two menu buttons.

7. The concentrated control system of claim 1, wherein the menu buttons are physical display buttons that can be pushed or touch screen display buttons.

8. The concentrated control system of claim 1, wherein the menu portions are rectangular, pentagonal, or hexagonal.

9. The concentrated control system of claim 1, wherein a layout structure formed by the first menu providing portion, the second menu providing portion, and the menu buttons is an N×N lattice structure or an M×N lattice structure.

10. The concentrated control system of claim 9, wherein, when the menu buttons include touch screen-type buttons, the N×N lattice structure is replaced with a (N+1)×(N+1) lattice structure, or the N×N lattice structure is replaced with the M×N lattice structure or vice versa, based on the menu mode of the menu portion.

11. The concentrated control system of claim 1, wherein, when the menu portion, the first menu providing portion, the second menu providing portion, and the menu buttons each include touch-sensitive display units, a layout structure formed by the first menu providing portion, the second menu providing portion, and the menu buttons is an N×N asymmetrical lattice structure or an M×N asymmetrical lattice structure.

12. The concentrated control system of claim 11, wherein the N×N asymmetrical lattice structure is replaced with a (N+1)×(N+1) asymmetrical lattice structure, or the N×N asymmetrical lattice structure is replaced with the M×N asymmetrical lattice structure or vice versa, based on the menu mode of the menu portion.

13. A concentrated control system for a vehicle, the system comprising:
- a display portion that displays menu modes associated with devices in the vehicle;
- a menu portion that enables one of the menu modes by rotating the display portion;
- a menu providing portion that, when an enabled menu mode is determined by the menu portion, displays menu buttons included in the enabled menu mode that controls functions of an in-vehicle device by rotating the menu buttons displayed by the display portion; and
- a reference display portion displaying an enabled menu, wherein
- the display portion, the menu portion, and the menu providing portion have a three-layer structure, and
- the menu providing portion rotates together with the menu portion and displays the menu buttons.

14. The concentrated control system of claim 13, wherein the menu providing portion and the menu portion, in order, are located under the display portion.

15. The concentrated control system of claim 13, wherein the menu buttons include first function buttons most frequently used in the menu mode and second function buttons that need to be immediately used in the menu mode.

16. The concentrated control system of claim 15, wherein the first function buttons each include at least one additional function button that is included in the menu buttons and appears when the first function buttons are pressed.

* * * * *